United States Patent [19]

Fry et al.

[11] Patent Number: 4,698,692
[45] Date of Patent: Oct. 6, 1987

[54] RADIATION GENERATING APPARATUS AND METHOD

[75] Inventors: Richard L. Fry, London; Richard J. Beaumont, Bedfordshire, both of United Kingdom

[73] Assignee: Crosfield Electronics (USA) Limited, London, England

[21] Appl. No.: 784,004

[22] Filed: Oct. 4, 1985

[30] Foreign Application Priority Data

Oct. 9, 1984 [GB] United Kingdom ................ 8425425

[51] Int. Cl.$^4$ .......................... H04N 1/22; G01D 9/42
[52] U.S. Cl. ..................................... 358/299; 358/296; 346/108
[58] Field of Search ................. 346/108, 1.1; 358/296, 358/299, 302; 369/116

[56] References Cited

U.S. PATENT DOCUMENTS 4,170,028 10/1979 DeBenedictis et al. ............ 358/285
4,549,190 10/1985 Ohara ................................. 346/108

FOREIGN PATENT DOCUMENTS 2514540  9/1982 France .
2537319 11/1983 France .
2054888  6/1980 United Kingdom .

Primary Examiner—E. A. Goldberg
Assistant Examiner—Linda M. Peco
Attorney, Agent, or Firm—Sughrue, Mion, Zinn, Macpeak & Seas

[57] ABSTRACT

A method and apparatus for generating a beam of radiation in which a beam of coherent radiation (2) is fed to a pair of A/O modulators (3,4). The beam is modulated by the modulator (4) in response to a chopped control function which chops between two levels, one of the levels comprising a reference level ($V_{low}$). The radiation beam is sampled at times corresponding to the application of the reference level control function to the modulator (4) and a feedback signal corresponding to the sampled power is fed to a comparator (12) where it is compared with a reference voltage ($V_{ref}$). The resultant error signal is applied to the modulator (3) so as to maintain at a substantially constant level the power of the sampled radiation when the chopped control function is at the reference level.

11 Claims, 2 Drawing Figures

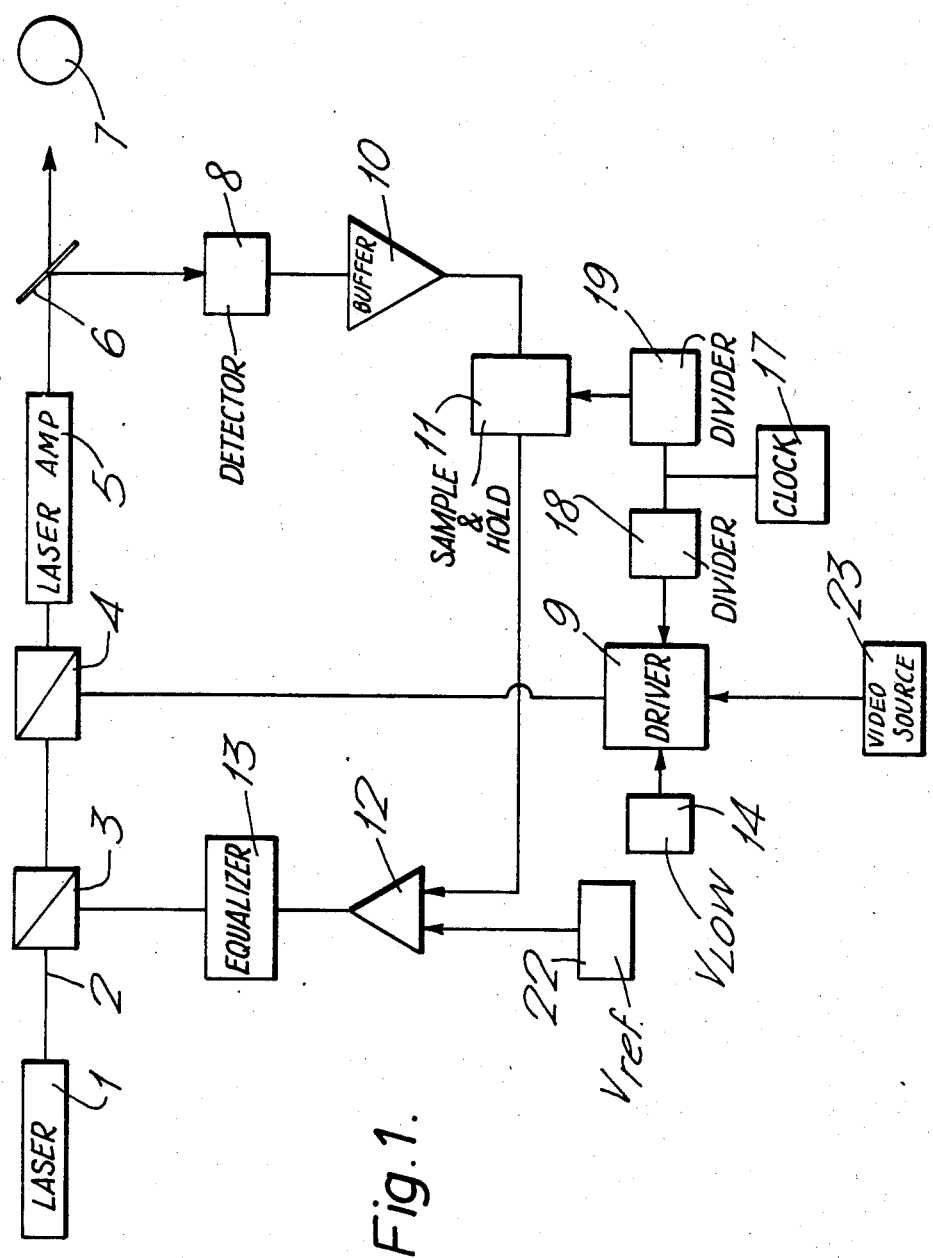

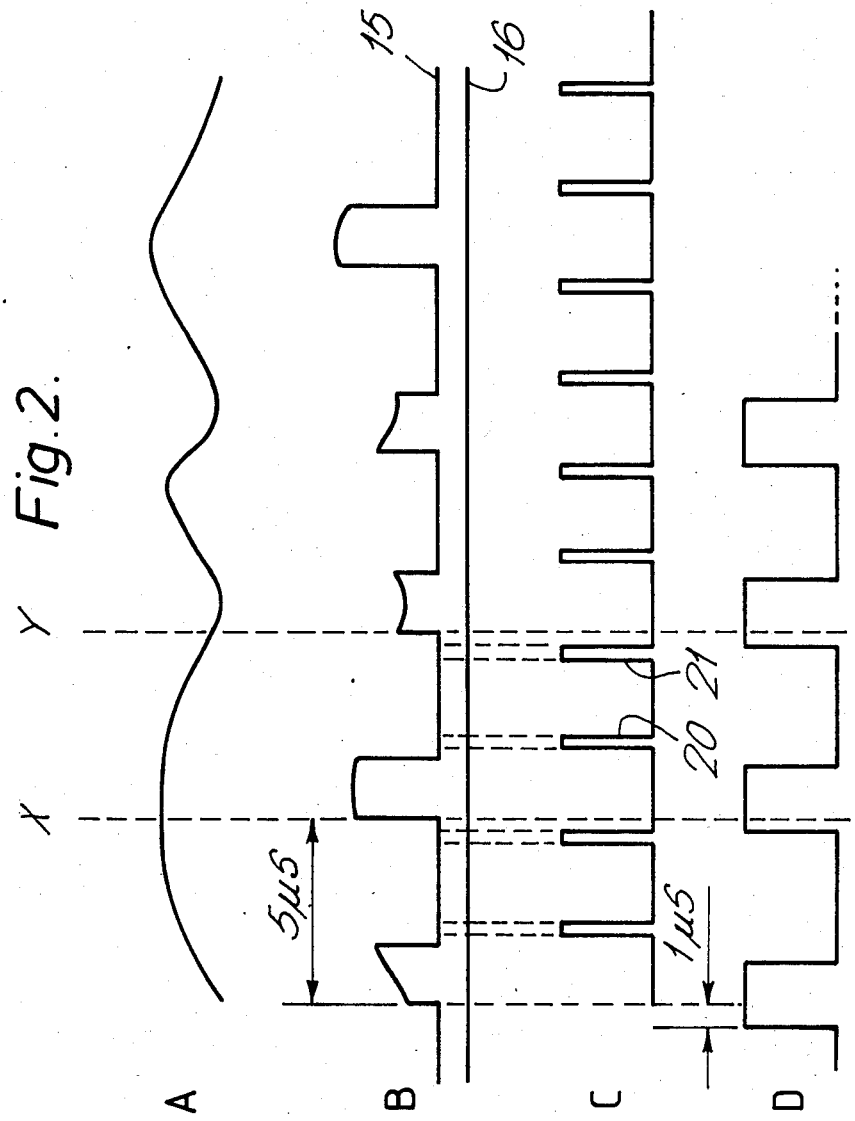

RADIATION GENERATING APPARATUS AND METHOD

FIELD OF THE INVENTION

The invention relates to methods and apparatus for generating beams of radiation and in particular to laser beam generating apparatus for use in laser gravure printing systems.

DESCRIPTION OF THE PRIOR ART

In conventional color scanning apparatus a record medium such as a gravure cylinder is exposed to a laser beam which is modulated in accordance with a video signal representing the intensity of a particular colour in an original image. In addition, the laser beam is controlled to switch on and off periodically so that discrete cells of the record medium are exposed. In this context, "off" means that the transmitted laser beam has insufficient power to engrave the record medium. In the past, modulation of the laser beam has been carried out using electro-optical beam modulators but more recently acousto-optic (A/O) modulators have been used instead with great benefits in output power and modulating speed. An example of colour scanning apparatus incorporating A/O modulators is illustrated in GB-A No. 2,054,888.

A/O modulators have one serious drawback, however. There is a transit delay of about 1-2 microseconds between applying a changed control function (typically a voltage) to the modulator and the acoustic wave reaching the laser beam and modulating it. Due to the construction of the modulators it is very difficult to reduce this delay (and may even be impossible). This time delay inside a conventional loop makes it impossible to achieve a closed loop bandwidth of greater than about 80 kHz. In laser gravure it is necessary to reproduce a 100 kHz square wave with reasonable wave shape which is not achievable in conventional arrangements.

SUMMARY OF THE INVENTION

In accordance with one aspect of the present invention, a method of generating a modulated beam of radiation comprises generating a beam of coherent radiation; modulating the beam at a first position in response to a chopped control function which chops between two levels, one of the levels comprising a reference level; sampling the radiation beam at a sampling position downstream of the first position and generating a feedback function related to the power of the sampled radiation; and modulating the beam at a second position upstream of the sampling position in response to the feedback function to maintain at a substantially constant level the power of the sampled beam when the chopped control function is at the reference level.

In accordance with a second aspect of the present invention, radiation generating apparatus comprises a source of coherent radiation; a pair of A/O modulators through which the radiation passes in use; first control means for applying a chopped control function to one of the modulators, the chopped control function chopping between two levels, one of the levels comprising a reference level; radiation sampling means downstream of the modulators for generating a feedback function proportional to the power of the sampled radiation; and second control means responsive to the feedback function to apply a gain control function to the other modulator to maintain at a substantially constant level the power of the sampled radiation when the chopped control function is at the reference level.

We have considered in some detail the purpose for using a closed loop feedback system and have concluded that the reasons for it are:

(a) to ensure absolute stability of power at lower frequencies, and
(b) to linearise the overall transfer curve of voltage-in to power-out.

There are two major contributors to the cause of power instability:

(i) variation in laser oscillator output power due to cavity length changes (typically ±30% with frequencies of up to about 100 cycles per hour), and
(ii) changes in laser amplifier gain due to gas mixture and pressure variations and due to saturation effects which cause the laser gain to vary with output power with a response time of between 100 microseconds and 1 millisecond.

It is thus apparent that a closed loop performance up to about 10 kHz only is required for gain stability reasons.

The predetermined reference level can be a maximum or a minimum. For example, when the chopped control function is a chopped video signal, the reference level may be a maximum when the video signal is zero. Conversely, for example when exposing negative images, the reference can be a maximum.

Where the control function is a video signal, the sampling means preferably includes a sample and hold circuit to remove the video modulation before the feedback function is generated. The second control means then acts to maintain the minimum power condition constant and conveniently achieves this by comparing the feedback function with a reference to generate the gain control function which is applied to the other modulator. This inner feedback loop thus ensures that low level output power is controlled for a known minimum of the chopped control function and thus defines the gain of the complete radiation generating apparatus, holding it stable for disturbances with a frequency below the bandwidth of this loop, normally about 30 kHz (limited by the sampling rate).

During the "on" period, the chopped control function rises to a new level and since the gain of the generating apparatus is stable (in the case of colour scanning apparatus at least for the duration of one cell) (approximately 10 microseconds)) the output power is predictable from a knowledge of the transfer characteristic of the one modulator.

In general, this feedback system would be difficult to implement because in a broad band application the gain can only be measured by a ratio detector connected to the input and output of the variable gain element and furthermore this latter technique cannot cope with the condition when the input and output power are both zero. In the particular environment of colour scanning apparatus "zero" power is simply a power below which the record medium will not be engraved.

Preferably, the sampling means is arranged to sample the radiation twice (or more) during each period for which the radiation has been modulated with the chopped control function at its reference level. The doubling of the sample rate almost doubles the available loop bandwidth. To assist this, when the reference level is a minimum, it is preferable if the "on" period of the chopped control function is less than the "off" period in each cycle.

The order of the modulators can be chosen to suit particular circumstances. Conveniently, the one modulator is positioned upstream from the other modulator.

BRIEF DESCRIPTION OF THE DRAWINGS

An example of colour scanning apparatus incorporating radiation generating apparatus for carrying out a method according to the invention will now be described with reference to the accompanying drawings, in which:

FIG. 1 is a block diagram of the apparatus; and,

FIG. 2 is a waveform diagram.

DETAILED DESCRIPTION OF THE INVENTION

The apparatus comprises a conventional laser oscillator 1 (e.g. Ferranti MBLA 200W $CO_2$ Laser (oscillator section)) for generating a coherent laser beam 2 which impinges on a first A/O modulator 3 (e.g. Interaction Corpn AGM404B). The modulated output from the modulator 3 is guided to a second A/O modulator 4 (e.g. Interaction Corpn AGM402) whose modulated output is fed to a conventional laser amplifier 5 (e.g. Ferranti MBLA 200W $CO_2$ Laser (Amplification Section)). For the sake of convenience, the paths of the laser beam between the elements of the apparatus have been shown in alignment although the modulators 3,4 will cause the beam selectively to diffract. The output from the laser amplifier 5 impinges on a partially transmitting mirror 6, the unreflected portion of the beam impinging on a rotating gravure cylinder 7 carrying a conventional record medium such as a plastic coating. A reflected portion of the beam impinges on a detector 8, such as a photodiode, which generates a voltage output proportional to the intensity of the impinging light beam.

The A/O modulator 4 is controlled by a conventional modulator driver 9. A video signal is fed into the driver 9, the video signal representing the intensity of a particular colour in an original image (not shown) in a conventional manner. The source of the video signal is indicated at 23 and typically comprises a controlling microcomputer. In addition, a fixed minimum voltage $V_{low}$ from a source 14 is fed to the driver 9 which is caused to generate an output for feeding to the modulator 4 which chops regularly between the video signal and the minimum voltage $V_{low}$. FIG. 2A illustrates the video signal.

FIG. 2B illustrates the form of the radiation impinging on the mirror 6. It will be seen that the video signal has been reduced to a discrete form of successive pulses which cause the gravure cylinder 7 to be selectively imaged with cells of varying size depending upon the power of the pulses. The reference voltage $V_{low}$ is chosen such that the corresponding power level 15 of the transmitted laser beam is insufficient to engrave the cylinder coating. A line 16 in FIG. 2B indicates the location of zero power level.

A high frequency clock 17 is provided to generate a high frequency clock signal which is fed to a pair of dividers 18, 19. The amount by which the dividers 18, 19 divide the incoming clock signal can be preset by an operator. This allows a chop signal of controlled mark space ratio to be fed to the modulator driver 9. This chop signal is illustrated in FIG. 2D.

It should be noted by comparing FIGS. 2B and 2D that the chop signal fed to the modulator driver 9 occurs slightly earlier in time (about 1 $\mu$second) than the corresponding affect in the transmitted laser beam. This is primarily due to transit time delays in the modulator 4. This has to be taken into account when determining the time at which sample pulses are generated (as will be described below).

The voltage output from the detector 8 is fed via a buffer 10 to a sample and hold circuit 11. The sample and hold circuit 11 removes the video modulation from the incoming voltage signal and is actuated by a chopping signal from the divider 19 (FIG. 2C). It will be seen by comparing FIGS. 2B and 2C that the chopping signal applied to the sample and hold circuit 11 is timed to occur when the laser beam is expected to be at the minimum power level 15 corresponding to the application of $V_{low}$ to the modulator 4. The mark space ratio of the chopping signal applied to the sample and hold circuit 11 is determined by the divider 19.

The operation of the dividers 18, 19 may be better understood by considering the period defined between the lines X, Y in FIG. 2. This period is set to correspond to 18 pulses of the high frequency clock 17 and the chop signals fed to the driver 9 and circuit 11 respectively are defined as follows:

pulses 1-7 laser on
pulses 8-19 laser off
pulses 8-9 sample pulse 20
pulses 17-18 sample pulse 21

It will be seen in FIG. 2 that the laser power is sampled twice in each minimum level period. The mark space ratio of the sampling clock signal fed to the circuit 11 is, however, constant. The reason for sampling twice in each minimum level period is to achieve a reasonable control bandwidth.

A voltage is generated by the sample and hold circuit 11 corresponding to the sampled power and is fed to an error amplifier 12. The error amplifier 12 compares this voltage with a reference voltage $V_{ref}$ from a voltage source 22 and causes a suitable gain correction voltage to be applied to the modulator 3.

The feedback circuit controlling the modulator 3 thus attempts to maintain the minimum output power $P_{low}$ of the laser beam at a constant magnitude and thus the gain of the apparatus is maintained substantially constant.

Although the feedback system described maintains optical gain of the apparatus substantially constant, the electrical gain of the feedback path can vary considerably. This prevents the loop from achieving adequate band-width under conditions when the loop gain is low. It can be shown that the combination of the gain variation in the laser amplifier 5 and the change of operating point of the modulator 3 cause the electrical loop gain to vary as b/tanax where x is the drive voltage applied to the modulator 3, and a, b are parameters. This gain variation may be corrected by an equaliser with a reciprocal characteristic, but, as the range of variation of x is limited in practice, a simple equaliser, 13 in FIG. 1, with characteristic $y = x^2$ provides almost complete equalisation.

We claim:

1. A method of generating a modulated beam of radiation, the method comprising generating a beam of coherent radiation; generating a chopped control function which chops between two levels, one of said levels comprising a reference level; modulating said beam at a first position in response to said chopped control function; sampling said radiation beam at a sampling position downstream of said first position and generating a feedback function related to the power of said sampled radiation; and modulating said beam at a second position upstream of said sampling position in response to said feedback function to maintain at a substantially constant level said power of said sampled beam when said chopped control function is at said reference level.

2. A method according to claim 1, wherein said chopped control function comprises a chopped video signal.

3. A method according to claim 1, wherein said radiation beam is sampled twice during each period for which said radiation beam has been modulated with said chopped control function at said reference level.

4. A method according to claim 1, wherein the "on" period of said chopped control function is less than the "off" period in each cycle when said reference level is a minimum.

5. A method according to claim 3, wherein the "on" period of said chopped control function is less than the "off" period in each cycle when said reference level is a minimum.

6. Radiation generating apparatus comprising a source of coherent radiation; a pair of A/O modulators through which said radiation is adapted to pass; first control means for applying a chopped control function to one of said modulators, said chopped control function chopping between two levels, one of said levels comprising a reference level; radiation sampling means downstream of said modulators for sampling said radiation and for generating a feedback function proportional to the power of said sampled radiation; and second control means responsive to said feedback function to apply a gain control function to the other of said modulators to maintain at a substantially constant level the power of the sampled radiation when said chopped control function is at said reference level.

7. Apparatus according to claim 6, wherein said second control means further comprises an equaliser circuit for maintaining the electrical gain of the feedback path substantially constant.

8. Radiation generating apparatus according to claim 6, further comprising means for supporting a record medium, wherein said reference level is chosen such that the power of said radiation impinging on said record medium is insufficient to expose said record medium when said chopped control function is at said reference level.

9. A laser gravure system comprising means for generating a video signal representative of an image to be reproduced; a source of coherent radiation; a pair of A/O modulators through which said radiation is adapted to pass, said radiation thereafter impinging on said gravure cylinder; means for generating a chop signal and for causing said video signal to chop between two levels, one of said levels comprising a reference level; first control means for applying said chopped video signal to one of said modulators; radiation sampling means downstream of said modulators for sampling said radiation and for generating a feedback function proportional to the power of said sampled radiation; and second control means responsive to said feedback function to apply a gain control function to the other of said modulators to maintain at a substantially constant level the power of said sampled radiation when said chopped control function is at said reference level.

10. A system according to claim 9, wherein said reference level is chosen such that the power of said radiation impinging on said gravure cylinder is insufficient to engrave said cylinder when said chopped video signal is at said reference level.

11. A method of exposing a record medium to a modulated radiation beam, the method comprising generating a beam of coherent radiation; generating a chopped control function which chops between two levels, one of said levels comprising a reference level; modulating said beam at a first position in response to said chopped control function; causing said modulated beam to impinge on a record medium; sampling said radiation beam at a sampling position downstream of said first position and upstream of said record medium and generating a feedback function related to the power of said sampled radiation; and modulating said beam at a second position upstream of said sampling position in response to said feedback function to maintain at a substantially constant level said power of said sampled beam when said chopped control function is at said reference level, wherein said reference level is chosen such that the power of said radiation beam impinging on said record medium is insufficient to expose said record medium when said chopped control function is at said reference level.

* * * * *